United States Patent
Yamamoto et al.

(10) Patent No.: US 11,482,707 B2
(45) Date of Patent: Oct. 25, 2022

(54) BINDER COMPOSITION FOR NON-AQUEOUS SECONDARY BATTERY, SLURRY COMPOSITION FOR NON-AQUEOUS SECONDARY BATTERY FUNCTIONAL LAYER, FUNCTIONAL LAYER FOR NON-AQUEOUS SECONDARY BATTERY, BATTERY COMPONENT FOR NON-AQUEOUS SECONDARY BATTERY, AND NON-AQUEOUS SECONDARY BATTERY

(71) Applicant: ZEON CORPORATION, Tokyo (JP)

(72) Inventors: Norikazu Yamamoto, Tokyo (JP); Shunjin Aihara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 228 days.

(21) Appl. No.: 16/766,291

(22) PCT Filed: Nov. 20, 2018

(86) PCT No.: PCT/JP2018/042893
§ 371 (c)(1),
(2) Date: May 22, 2020

(87) PCT Pub. No.: WO2019/107229
PCT Pub. Date: Jun. 6, 2019

(65) Prior Publication Data
US 2021/0135225 A1    May 6, 2021

(30) Foreign Application Priority Data
Nov. 30, 2017 (JP) .............. JP2017-230493

(51) Int. Cl.
H01M 4/62 (2006.01)
H01M 4/36 (2006.01)
H01M 10/0525 (2010.01)

(52) U.S. Cl.
CPC .......... *H01M 4/622* (2013.01); *H01M 4/366* (2013.01); *H01M 10/0525* (2013.01)

(58) Field of Classification Search
None
See application file for complete search history.

(56) References Cited

U.S. PATENT DOCUMENTS 10,312,521 B2   6/2019 Toyoda et al.
2016/0036055 A1* 2/2016 Yamamoto .......... H01M 4/1393
                                                   252/511

(Continued)

FOREIGN PATENT DOCUMENTS

CN    105765775 A    7/2016
CN    105849943 A    8/2016

(Continued)

OTHER PUBLICATIONS

Jun. 2, 2020, International Preliminary Report on Patentability issued in the International Patent Application No. PCT/JP2018/042893.

(Continued)

*Primary Examiner* — Wyatt P McConnell
(74) *Attorney, Agent, or Firm* — Kenja IP Law PC

(57) ABSTRACT

Provided is a binder composition for a non-aqueous secondary battery with which it is possible to form a slurry composition for a non-aqueous secondary battery functional layer having excellent viscosity stability and a functional layer for a non-aqueous secondary battery having excellent pressability. The binder composition for a non-aqueous secondary battery contains water and a particulate polymer formed by a polymer including a block region composed of an aromatic vinyl monomer unit. The particulate polymer has a surface acid content of not less than 0.05 mmol/g and not more than 0.9 mmol/g.

11 Claims, 1 Drawing Sheet

(56) References Cited

U.S. PATENT DOCUMENTS

| | | | |
|---|---|---|---|
| 2017/0012280 A1* | 1/2017 | Ueda | H01M 4/364 |
| 2017/0309916 A1* | 10/2017 | Toyoda | H01M 50/411 |
| 2017/0317352 A1* | 11/2017 | Lee | H01M 10/4235 |
| 2017/0324097 A1* | 11/2017 | Lee | H01M 10/4235 |
| 2019/0044147 A1 | 2/2019 | Yamamoto | |

FOREIGN PATENT DOCUMENTS

| | | |
|---|---|---|
| CN | 107004859 A | 8/2017 |
| WO | 2011013604 A1 | 2/2011 |
| WO | 2011024789 A1 | 3/2011 |
| WO | 2015098507 A1 | 7/2015 |
| WO | 2015115089 A1 | 8/2015 |
| WO | 2016084364 A1 | 6/2016 |
| WO | 2017056404 A1 | 4/2017 |

OTHER PUBLICATIONS

Jan. 8, 2019, International Search Report issued in the International Patent Application No. PCT/JP2018/042893.

Jun. 2, 2021, the Extended European Search Report issued by the European Patent Office in the corresponding European Patent Application No. 18882973.3.

\* cited by examiner

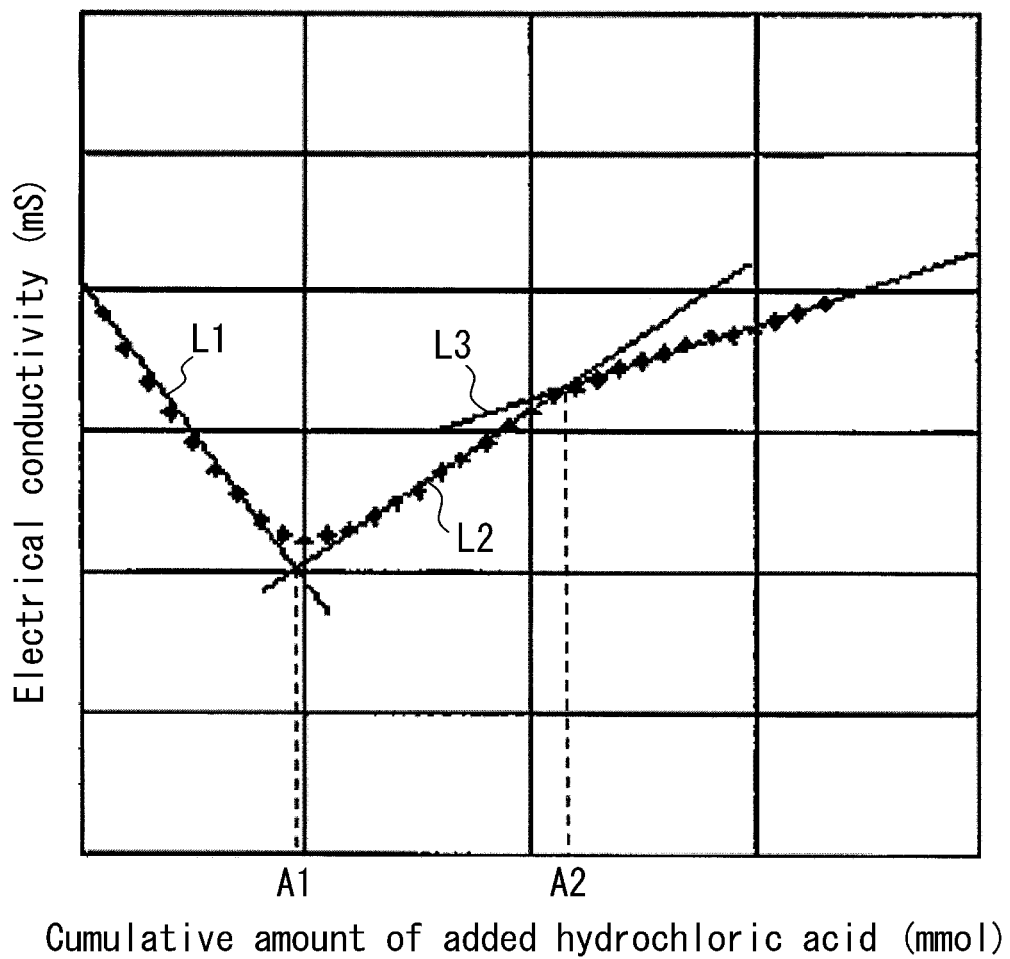

BINDER COMPOSITION FOR NON-AQUEOUS SECONDARY BATTERY, SLURRY COMPOSITION FOR NON-AQUEOUS SECONDARY BATTERY FUNCTIONAL LAYER, FUNCTIONAL LAYER FOR NON-AQUEOUS SECONDARY BATTERY, BATTERY COMPONENT FOR NON-AQUEOUS SECONDARY BATTERY, AND NON-AQUEOUS SECONDARY BATTERY

TECHNICAL FIELD

The present disclosure relates to a binder composition for a non-aqueous secondary battery, a slurry composition for a non-aqueous secondary battery functional layer, a functional layer for a non-aqueous secondary battery, a battery component for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery components such as electrodes (positive electrode and negative electrode) and a separator that isolates the positive electrode and the negative electrode from one another.

There are cases in which a battery component including a functional layer that contains a binder and also optionally contains particles that are compounded in order to cause the battery component to display a desired function (hereinafter, referred to as "functional particles") is used as a component of a secondary battery.

Specifically, a separator that includes an adhesive layer containing a binder and/or a porous membrane layer containing a binder and non-conductive particles as functional particles on a separator substrate may be used as a separator of a secondary battery. Moreover, an electrode that includes an electrode mixed material layer containing a binder and electrode active material particles as functional particles on a current collector or an electrode that further includes an adhesive layer and/or a porous membrane layer such as described above on an electrode substrate including an electrode mixed material layer on a current collector may be used as an electrode of a secondary battery.

A battery component including a functional layer such as described above is formed by, for example, applying a slurry composition containing functional particles, a binder-containing binder composition, and so forth onto a separator substrate, a current collector, or an electrode substrate, and then drying the applied slurry composition.

Attempts have been made to improve binder compositions used in the formation of functional layers in recent years with the aim of achieving further improvement of secondary battery performance.

In one specific example, Patent Literature (PTL) 1 discloses that coatability and leveling properties of a slurry for electrode formation are improved and that close adherence of an electrode mixed material layer to a current collector is increased by using, as a binder composition, a composition for electrode formation that contains a binder resin and a modification polymer formed by a polymer including a sulfonic acid (salt) group.

CITATION LIST

Patent Literature

PTL 1: WO 2011/024789 A1

SUMMARY

Technical Problem

There are cases in which an electrode that includes an electrode mixed material layer as a functional layer is subjected to a pressing process by roll pressing with the aim of densification of the electrode mixed material layer, for example. Moreover, there are cases in which a battery component that includes a porous membrane layer and/or an adhesive layer as a functional layer is pressed in a stacked state with a battery component that is adhered via the functional layer with the aim of improving adhesiveness.

Therefore, a functional layer that is formed using a binder composition needs to suitably deform during pressing (i.e., have excellent pressability).

However, it has not been possible to achieve sufficient pressability with a functional layer formed using the conventional binder composition described above.

Moreover, there is room for improvement of a slurry composition in which the conventional binder composition described above is used in terms of improving viscosity stability of the slurry composition.

Accordingly, one objective of the present disclosure is to provide a binder composition for a non-aqueous secondary battery with which it is possible to form a slurry composition for a non-aqueous secondary battery functional layer having excellent viscosity stability and a functional layer for a non-aqueous secondary battery having excellent pressability.

Another objective of the present disclosure is to provide a slurry composition for a non-aqueous secondary battery functional layer that has excellent viscosity stability and with which it is possible to form a functional layer for a non-aqueous secondary battery having excellent pressability.

Yet another objective of the present disclosure is to provide a functional layer for a non-aqueous secondary battery that has excellent pressability, a battery component for a non-aqueous secondary battery that includes this functional layer for a non-aqueous secondary battery, and a non-aqueous secondary battery that includes this battery component for a non-aqueous secondary battery.

Solution to Problem

The inventors conducted diligent investigation with the aim of solving the problems set forth above. The inventors discovered that it is possible to obtain a slurry composition for a non-aqueous secondary battery functional layer having excellent viscosity stability and a functional layer for a non-aqueous secondary battery having excellent pressability by using a binder composition containing water and a particulate polymer that is formed by a polymer including a block region composed of an aromatic vinyl monomer unit and that has a surface acid content within a specific range, and, in this manner, the inventors completed the present disclosure.

Specifically, the present disclosure aims to advantageously solve the problems set forth above by disclosing a binder composition for a non-aqueous secondary battery comprising: a particulate polymer formed by a polymer including a block region composed of an aromatic vinyl monomer unit; and water, wherein the particulate polymer has a surface acid content of not less than 0.05 mmol/g and not more than 0.9 mmol/g. By using an aqueous binder composition containing a particulate polymer that is formed by a polymer including a block region composed of an aromatic vinyl monomer unit and that has a surface acid content of not less than 0.05 mmol/g and not more than 0.9 mmol/g in this manner, it is possible to obtain a slurry composition for a non-aqueous secondary battery functional layer having excellent viscosity stability and a functional layer for a non-aqueous secondary battery having excellent pressability.

Note that a "monomer unit" of a polymer referred to in the present disclosure is "a repeating unit derived from the monomer that is included in a polymer obtained using the monomer".

Moreover, when a polymer is said to "include a block region composed of a monomer unit" in the present disclosure, this means that "a section in which only monomer units of that type are bonded to one another in a row as repeating units is present in the polymer".

Furthermore, the "surface acid content" of a particulate polymer referred to in the present disclosure is the surface acid content per 1 g of solid content of the particulate polymer and can be measured by a measurement method described in the EXAMPLES section of the present specification.

In the presently disclosed binder composition for a non-aqueous secondary battery, the polymer may further include a coupling moiety.

Note that in the present disclosure, a "coupling moiety" in a polymer refers to "a moiety that is derived from a coupling agent and that is included in a polymer obtained through a coupling reaction using the coupling agent".

In the presently disclosed binder composition for a non-aqueous secondary battery, the polymer preferably further includes either or both of an aliphatic conjugated diene monomer unit and an alkylene structural unit. When the polymer forming the particulate polymer includes an aliphatic conjugated diene monomer unit and/or an alkylene structural unit, adhesiveness of a battery component that includes a functional layer can be further improved.

In the presently disclosed binder composition for a non-aqueous secondary battery, the polymer preferably has a tetrahydrofuran-insoluble content of not less than 5 mass % and not more than 50 mass %. When the tetrahydrofuran-insoluble content of the polymer forming the particulate polymer is within the range set forth above, electrolyte solution injectability of a functional layer can be increased, and a battery component that includes a functional layer can be caused to display excellent adhesiveness even before immersion in electrolyte solution.

The "tetrahydrofuran-insoluble content" of a polymer referred to in the present disclosure can be measured by a method described in the EXAMPLES section of the present specification.

In the presently disclosed binder composition for a non-aqueous secondary battery, the polymer is preferably obtained through cross-linking of a block polymer including an aliphatic conjugated diene monomer unit and a block region composed of an aromatic vinyl monomer unit. By using a particulate polymer that is formed by a polymer obtained through cross-linking of a block polymer including an aliphatic conjugated diene monomer unit and a block region composed of an aromatic vinyl monomer unit, electrolyte solution injectability of a functional layer can be further improved.

The present disclosure also aims to advantageously solve the problems set forth above by disclosing a slurry composition for a non-aqueous secondary battery functional layer comprising any one of the binder compositions for a non-aqueous secondary battery set forth above. The inclusion of any one of the binder compositions for a non-aqueous secondary battery set forth above in this manner improves viscosity stability and can increase pressability of a functional layer formed using the slurry composition for a non-aqueous secondary battery functional layer.

The presently disclosed slurry composition for a non-aqueous secondary battery functional layer preferably further comprises electrode active material particles. By using the slurry composition for a non-aqueous secondary battery functional layer that contains electrode active material particles as functional particles to form an electrode mixed material layer, it is possible to produce an electrode having excellent pressability.

Moreover, the presently disclosed slurry composition for a non-aqueous secondary battery functional layer preferably further comprises non-conductive particles. By using the slurry composition for a non-aqueous secondary battery functional layer that contains non-conductive particles as functional particles to form a porous membrane layer, it is possible to produce a porous membrane layer-equipped battery component (separator or electrode) having excellent pressability.

The present disclosure also aims to advantageously solve the problems set forth above by disclosing a functional layer for a non-aqueous secondary battery formed using any one of the slurry compositions for a non-aqueous secondary battery functional layer set forth above. A functional layer that is formed using any one of the slurry compositions set forth above has excellent pressability.

The present disclosure also aims to advantageously solve the problems set forth above by disclosing a battery component for a non-aqueous secondary battery comprising the functional layer for a non-aqueous secondary battery set forth above. A battery component, such as a separator or an electrode, that includes the functional layer set forth above has excellent pressability.

The present disclosure also aims to advantageously solve the problems set forth above by disclosing a non-aqueous secondary battery comprising the battery component for a non-aqueous secondary battery set forth above. By using the battery component set forth above, it is possible to obtain a non-aqueous secondary battery that can display excellent performance.

Advantageous Effect

Through the presently disclosed binder composition for a non-aqueous secondary battery, it is possible to obtain a slurry composition for a non-aqueous secondary battery functional layer having excellent viscosity stability and a functional layer for a non-aqueous secondary battery having excellent pressability.

Moreover, the presently disclosed slurry composition for a non-aqueous secondary battery functional layer has excellent viscosity stability and can form a functional layer for a non-aqueous secondary battery having excellent pressability.

Furthermore, according to the present disclosure, it is possible to obtain a functional layer for a non-aqueous secondary battery that has excellent pressability, a battery component for a non-aqueous secondary battery that includes this functional layer for a non-aqueous secondary battery, and a non-aqueous secondary battery that includes this battery component for a non-aqueous secondary battery.

BRIEF DESCRIPTION OF THE DRAWING

In the accompanying drawing,

FIG. 1 is a graph in which electrical conductivity is plotted against a cumulative amount of added hydrochloric acid in calculation of surface acid content of a particulate polymer.

DETAILED DESCRIPTION

The following provides a detailed description of embodiments of the present disclosure.

The presently disclosed binder composition for a non-aqueous secondary battery is a binder composition for use in production of a non-aqueous secondary battery and can, for example, be used to produce the presently disclosed slurry composition for a non-aqueous secondary battery functional layer. Moreover, the presently disclosed slurry composition for a non-aqueous secondary battery functional layer can be used to form any functional layer (for example, an electrode mixed material layer, a porous membrane layer, or an adhesive layer) having a function such as giving and receiving electrons, reinforcement, or adhesion inside a non-aqueous secondary battery. Furthermore, the presently disclosed functional layer for a non-aqueous secondary battery is formed from the presently disclosed slurry composition for a non-aqueous secondary battery functional layer. Also, the presently disclosed battery component for a non-aqueous secondary battery is an electrode or a separator, for example, and includes the presently disclosed functional layer for a non-aqueous secondary battery. Moreover, the presently disclosed non-aqueous secondary battery includes the presently disclosed battery component for a non-aqueous secondary battery.

(Binder Composition for Non-Aqueous Secondary Battery)

The presently disclosed binder composition contains a particulate polymer and an aqueous medium, and may optionally further contain a water-soluble polymer and other components that can be compounded in binder compositions.

The presently disclosed binder composition can be used to produce a slurry composition for a non-aqueous secondary battery functional layer having excellent viscosity stability and to form a functional layer for a non-aqueous secondary battery having excellent pressability as a result of the particulate polymer being formed by a polymer that includes a block region composed of an aromatic vinyl monomer unit and having a surface acid content of not less than 0.05 mmol/g and not more than 0.9 mmol/g.

Although it is not clear why a slurry composition having excellent viscosity stability and a functional layer having excellent pressability are obtained, the reason is presumed to be as follows. The presently disclosed binder composition can be dispersed well in an aqueous medium as a result of containing the particulate polymer having a surface acid content that is not less than a specific value. Therefore, by using the presently disclosed binder composition, it is possible to inhibit aggregation of a slurry composition and to obtain a slurry composition having excellent viscosity stability. Moreover, the particulate polymer contained in the presently disclosed binder composition is readily squashed and deformed during pressing as a result of having a surface acid content that is not more than a specific value and being formed by a polymer that includes a block region composed of an aromatic vinyl monomer unit. Therefore, by using the presently disclosed binder composition, it is possible to form a functional layer having excellent pressability.

<Particulate Polymer>

The particulate polymer is a component that functions as a binder. In a functional layer formed on a substrate using a slurry composition that contains the binder composition, the particulate polymer holds components such as functional particles so that they do not become detached from the functional layer and enables adhesion of battery components to one another via the functional layer.

The particulate polymer is in the form of water-insoluble particles that are formed by a specific polymer. Note that when particles are referred to as "water-insoluble" in the present disclosure, this means that when 0.5 g of the polymer is dissolved in 100 g of water at a temperature of 25° C., insoluble content is 90 mass % or more.

[Polymer]

The polymer forming the particulate polymer is a copolymer including a block region composed of an aromatic vinyl monomer unit (hereinafter, also referred to simply as the "aromatic vinyl block region") and a macromolecule chain portion in which repeating units other than aromatic vinyl monomer units are linked (hereinafter, also referred to simply as the "other region"). The aromatic vinyl block region and the other region are present adjacently to one another in the polymer. Also note that the polymer may include just one aromatic vinyl block region or may include a plurality of aromatic vinyl block regions. Likewise, the polymer may include just one other region or may include a plurality of other regions.

The polymer forming the particulate polymer preferably has a tetrahydrofuran-insoluble content of not less than 5 mass % and not more than 50 mass %.

—Aromatic Vinyl Block Region—

The aromatic vinyl block region is a region that only includes an aromatic vinyl monomer unit as a repeating unit as previously described.

Note that a single aromatic vinyl block region may be composed of just a single type of aromatic vinyl monomer unit or may be composed of a plurality of types of aromatic vinyl monomer units, but is preferably composed of just a single type of aromatic vinyl monomer unit.

Moreover, a single aromatic vinyl block region may include a coupling moiety (i.e., aromatic vinyl monomer units of a single aromatic vinyl block region may be linked with a coupling moiety interposed in-between).

In a case in which the polymer includes a plurality of aromatic vinyl block regions, the types and proportions of aromatic vinyl monomer units in the plurality of aromatic vinyl block regions may be the same or different, but are preferably the same.

Examples of aromatic vinyl monomers that can form an aromatic vinyl monomer unit of the aromatic vinyl block region in the polymer include aromatic monovinyl compounds such as styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one of these aromatic vinyl monomers is used individually.

The proportion constituted by the aromatic vinyl monomer unit in the polymer when the amount of all repeating units (monomer units and structural units) in the polymer is taken to be 100 mass % is preferably 2 mass % or more, more preferably 10 mass % or more, and even more preferably 15 mass % or more, and is preferably 50 mass % or less, more preferably 45 mass % or less, and even more preferably 40 mass % or less. When the proportion constituted by the aromatic vinyl monomer unit in the polymer is 2 mass % or more, expression of tackiness by the polymer can be sufficiently inhibited. Consequently, even in a situation in which a functional layer such as an electrode mixed material layer is subjected to a pressing process by roll pressing, the occurrence of faults and reduced productivity due to adhesion of the functional layer to a roll can be inhibited. On the other hand, when the proportion constituted by the aromatic vinyl monomer unit in the polymer is 50 mass % or less, flexibility of the polymer is ensured, and pressability of a functional layer can be further improved.

Note that the proportion constituted by the aromatic vinyl monomer unit in the polymer is normally the same as the proportion constituted by the aromatic vinyl block region in the polymer.

—Other Region—

The other region is a region that only includes a repeating unit other than an aromatic vinyl monomer unit (hereinafter, also referred to simply as the "other repeating unit") as a repeating unit as previously described.

Note that a single other region may be composed of one type of other repeating unit or may be composed of a plurality of types of other repeating units.

Moreover, a single other region may include a coupling moiety (i.e., other repeating units of a single other region may be linked with a coupling moiety interposed in-between).

Furthermore, the other region may include a graft portion and/or a cross-linked structure.

In a case in which the polymer includes a plurality of other regions, the types and proportions of other repeating units in the plurality of other regions may be the same or different.

Although no specific limitations are placed on the other repeating units composing the other region of the polymer, an aliphatic conjugated diene monomer unit and/or an alkylene structural unit are preferable from a viewpoint of improving adhesiveness of a battery component, for example.

Examples of aliphatic conjugated diene monomers that can form the aliphatic conjugated diene monomer unit include conjugated diene compounds having a carbon number of 4 or more such as 1,3-butadiene, isoprene, 2,3-dimethyl-1,3-butadiene, and 1,3-pentadiene. One of these aliphatic conjugated diene monomers may be used individually, or two or more of these aliphatic conjugated diene monomers may be used in combination. Of these aliphatic conjugated diene monomers, 1,3-butadiene and isoprene are preferable from a viewpoint of further improving adhesiveness of a battery component.

The alkylene structural unit is a repeating unit composed only of an alkylene structure represented by a general formula —$C_nH_{2n}$— (n is an integer of 2 or more).

Although the alkylene structural unit may be linear or branched, the alkylene structural unit is preferably linear (i.e., is preferably a linear alkylene structural unit). Moreover, the alkylene structural unit preferably has a carbon number of 4 or more (i.e., n in the preceding general formula is preferably an integer of 4 or more).

No specific limitations are placed on the method by which the alkylene structural unit is introduced into the polymer. For example, a method in which a block polymer including an aliphatic conjugated diene monomer unit and a block region composed of an aromatic vinyl monomer unit is hydrogenated to convert the aliphatic conjugated diene monomer unit to an alkylene structural unit and obtain the polymer is preferable because production of the polymer is simple.

Examples of aliphatic conjugated diene monomers that can be used in the method described above include the conjugated diene compounds having a carbon number of 4 or more that were previously described as aliphatic conjugated diene monomers that can form the aliphatic conjugated diene monomer unit, of which, isoprene is preferable. In other words, the alkylene structural unit is preferably a structural unit obtained through hydrogenation of an aliphatic conjugated diene monomer unit (i.e., is preferably a hydrogenated aliphatic conjugated diene unit), and is more preferably a structural unit obtained through hydrogenation of an isoprene unit (i.e., is more preferably a hydrogenated isoprene unit). Selective hydrogenation of an aliphatic conjugated diene monomer unit can be carried out by a commonly known method such as an oil-layer hydrogenation method or a water-layer hydrogenation method.

Moreover, it is preferable that the other repeating units composing the other region of the polymer include a structural unit that is obtained through cross-linking of an aliphatic conjugated diene monomer unit from a viewpoint of improving electrolyte solution injectability of a functional layer, for example, but this is not a specific limitation. In other words, the polymer forming the particulate polymer is preferably a polymer obtained through cross-linking of a block polymer that includes an aliphatic conjugated diene monomer unit and a block region composed of an aromatic vinyl monomer unit.

The structural unit obtained through cross-linking of an aliphatic conjugated diene monomer unit can be introduced into the polymer through cross-linking of a block polymer including an aliphatic conjugated diene monomer unit and a block region composed of an aromatic vinyl monomer unit.

The cross-linking can be performed without any specific limitations using a radical initiator such as a redox initiator that is a combination of an oxidizing agent and a reducing agent, for example. Examples of oxidizing agents that can be used include organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide. Examples of reducing agents that can be used include compounds including a metal ion in a reduced state such as ferrous sulfate and copper naphthenate; sulfonic acid compounds such as sodium methanesulfonate; and amine compounds such as dimethylaniline. One of these organic peroxides and reducing agents may be used individually, or two or more of these organic peroxides and reducing agents may be used in combination.

Also note that the cross-linking may be carried out in the presence of a cross-linker such as a polyvinyl compound (divinylbenzene, etc.), a polyallyl compound (diallyl phthalate, triallyl trimellitate, diethylene glycol bis(allyl carbonate), etc.), or a glycol (ethylene glycol diacrylate, etc.). Moreover, the cross-linking can be performed by irradiation with active energy rays such as γ-rays.

The total amount of an aliphatic conjugated diene monomer unit, a structural unit obtained through cross-linking of an aliphatic conjugated diene monomer unit, and an alkylene structural unit in the polymer forming the particulate polymer when the amount of all repeating units in the polymer is taken to be 100 mass % is preferably 50 mass % or more, and more preferably 65 mass % or more, and is preferably 98 mass % or less, and more preferably 95 mass % or less. Moreover, the proportion constituted by an aliphatic conjugated diene monomer unit in the block polymer including an aliphatic conjugated diene monomer unit and a block region composed of an aromatic vinyl monomer unit (i.e., the block polymer that undergoes hydrogenation and/or cross-linking) when the amount of all repeating units in the block polymer is taken to be 100 mass % is preferably 50 mass % or more, and more preferably 65 mass % or more, and is preferably 98 mass % or less, and more preferably 95 mass % or less.

When the proportion constituted by an aliphatic conjugated diene monomer unit, a structural unit obtained through cross-linking of an aliphatic conjugated diene monomer unit, and an alkylene structural unit in the polymer is 50 mass % or more, adhesiveness of a battery component can be improved. On the other hand, when the proportion constituted by an aliphatic conjugated diene monomer unit, a structural unit obtained through cross-linking of an aliphatic conjugated diene monomer unit, and an alkylene structural unit in the polymer is 98 mass % or less, it is possible to ensure flexibility of the polymer and further improve pressability of a functional layer, and also to sufficiently inhibit expression of tackiness by the polymer.

Note that the other region of the polymer may include repeating units other than an aliphatic conjugated diene monomer unit, a structural unit obtained through cross-linking of an aliphatic conjugated diene monomer unit, and an alkylene structural unit. Specifically, the other region of the polymer may include other monomer units such as an acidic group-containing monomer unit (carboxyl group-containing monomer unit, sulfo group-containing monomer unit, phosphate group-containing monomer unit, etc.), a nitrile group-containing monomer unit (acrylonitrile unit, methacrylonitrile unit, etc.), and a (meth)acrylic acid ester monomer unit (acrylic acid alkyl ester unit, methacrylic acid alkyl ester unit, etc.). Note that in the present disclosure, "(meth)acrylic acid" is used to indicate "acrylic acid" and/or "methacrylic acid".

Of these other monomer units, the inclusion of an acidic group-containing monomer unit in the other region of the polymer is preferable from a viewpoint of setting the surface acid content of the particulate polymer to an appropriate level and improving viscosity stability of a slurry composition.

Also note that the acidic group of the acidic group-containing monomer unit may form a salt with an alkali metal, ammonia, or the like.

Examples of carboxyl group-containing monomers that can form a carboxyl group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as butyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, dimethylmaleic anhydride, and citraconic anhydride.

Moreover, an acid anhydride that produces a carboxyl group through hydrolysis can be used as a carboxyl group-containing monomer.

Furthermore, an ethylenically unsaturated polybasic carboxylic acid such as butene tricarboxylic acid or a partial ester of an ethylenically unsaturated polybasic carboxylic acid such as monobutyl fumarate or mono-2-hydroxypropyl maleate can be used as a carboxyl group-containing monomer.

Examples of sulfo group-containing monomers that can form a sulfo group-containing monomer unit include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers that can form a phosphate group-containing monomer unit include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of the monomers described above may be used individually, or two or more of the monomers described above may be used in combination. Of acidic group-containing monomers that can form an acidic group-containing monomer unit, methacrylic acid, itaconic acid, and acrylic acid are preferable, and methacrylic acid is more preferable.

In a case in which the polymer includes an acidic group-containing monomer unit, the proportion constituted by the acidic group-containing monomer unit in the polymer when the amount of all repeating units in the polymer is taken to be 100 mass % is preferably 0.1 mass % or more, more preferably 0.5 mass % or more, and even more preferably 1 mass % or more, and is preferably 20 mass % or less, more preferably 18 mass % or less, and even more preferably 15 mass % or less.

Other monomer units such as the acidic group-containing monomer unit, the nitrile group-containing monomer unit, and the (meth)acrylic acid ester monomer unit described above can be introduced into the polymer by any polymerization method, such as graft polymerization, without any specific limitations. Note that in a case in which another monomer unit is introduced by graft polymerization, the polymer includes a graft portion and has a structure in which a polymer forming the graft portion is bonded to a polymer forming a trunk portion.

The graft polymerization can be carried out by a known graft polymerization method without any specific limitations. Specifically, the graft polymerization can be carried out using a radical initiator such as a redox initiator that is a combination of an oxidizing agent and a reducing agent, for example. The oxidizing agent and the reducing agent can be any of the previously described oxidizing agents and reducing agents that can be used for cross-linking a block polymer including an aliphatic conjugated diene monomer unit and a block region composed of an aromatic vinyl monomer unit.

Moreover, in a case in which a redox initiator is used to perform graft polymerization with respect to a block polymer including an aliphatic conjugated diene monomer unit and a block region composed of an aromatic vinyl monomer unit, it is possible to cause introduction of another monomer unit by graft polymerization and cross-linking of the aliphatic conjugated diene monomer unit to proceed concurrently. However, it is not necessary for graft polymerization and cross-linking to proceed concurrently, and the type of radical initiator and the reaction conditions may be adjusted such that only graft polymerization proceeds.

—Tetrahydrofuran-Insoluble Content—

The tetrahydrofuran-insoluble content of the polymer forming the particulate polymer is preferably 5 mass % or more, more preferably 6 mass % or more, and even more preferably 8 mass % or more, and is preferably 50 mass % or less, more preferably 48 mass % or less, even more preferably 45 mass % or less, and particularly preferably 40 mass % or less. When the tetrahydrofuran-insoluble content of the polymer is not less than any of the lower limits set forth above, electrolyte solution injectability of a functional layer can be sufficiently increased. Moreover, when the tetrahydrofuran-insoluble content of the polymer is not more than any of the upper limits set forth above, a functional layer can be caused to display excellent adhesive strength even before immersion in electrolyte solution, and coatability of a slurry composition can be improved.

Note that the tetrahydrofuran-insoluble content of the polymer can be adjusted by altering the chemical composition of the polymer. For example, the tetrahydrofuran-insoluble content of the polymer can be increased by introducing a cross-linked structure into the polymer.

[Surface Acid Content]

The surface acid content of the particulate polymer is required to be not less than 0.05 mmol/g and not more than 0.9 mmol/g, is preferably 0.08 mmol/g or more, and more preferably 0.10 mmol/g or more, and is preferably 0.70 mmol/g or less, more preferably 0.50 mmol/g or less, and even more preferably 0.45 mmol/g or less. If the surface acid content of the particulate polymer is less than 0.05 mmol/g, viscosity stability of a slurry composition produced using the binder composition decreases. On the other hand, viscosity stability of a slurry composition can be sufficiently increased when the surface acid content of the particulate polymer is not less than any of the lower limits set forth above. Moreover, if the surface acid content of the particulate polymer is more than 0.9 mmol/g, pressability of a functional layer formed using the binder composition decreases. On the other hand, pressability of a functional layer can be sufficiently increased when the surface acid content of the particulate polymer is not more than any of the upper limits set forth above. Coatability of a slurry composition can also be improved when the surface acid content of the particulate polymer is within any of the ranges set forth above.

The surface acid content of the particulate polymer can be adjusted by altering the types and amounts of monomers used in production of the polymer that is used as the particulate polymer and the production conditions. Specifically, the surface acid content can be increased by increasing the used amount of an acidic group-containing monomer such as a carboxyl group-containing monomer, for example.

[Production Method of Particulate Polymer]

The particulate polymer formed by the polymer described above can be produced, for example, through a step of block polymerizing monomers such as the previously described aromatic vinyl monomer and aliphatic conjugated diene monomer in an organic solvent to obtain a solution of a block polymer including an aromatic vinyl block region (block polymer solution production step), a step of adding water to the obtained solution of the block polymer and performing emulsification to form particles of the block polymer (emulsification step), and a step of performing graft polymerization with respect to the block polymer that has been formed into particles so as to obtain a water dispersion of a particulate polymer formed by a specific polymer (grafting step).

Note that the grafting step may be performed before the emulsification step in production of the particulate polymer. In other words, the particulate polymer may be produced by, after the block polymer solution production step, implementing a step of performing graft polymerization with respect to the block polymer contained in the obtained block polymer solution to obtain a solution of a specific polymer (grafting step), and then implementing a step of adding water to the obtained solution of the specific polymer and performing emulsification to form particles of the specific polymer (emulsification step).

—Block Polymer Solution Production Step—

No specific limitations are placed on the method of block polymerization in the block polymer solution production step. For example, the block polymer can be produced by polymerizing a first monomer component, adding a second monomer component, differing from the first monomer component, to the resultant solution and performing polymerization thereof, and further repeating addition and polymerization of monomer components as necessary. The organic solvent used as the reaction solvent is not specifically limited and can be selected as appropriate depending on the types of monomers and so forth.

The block polymer obtained through block polymerization as described above is preferably subjected to a coupling reaction using a coupling agent in advance of the subsequently described emulsification step. The coupling reaction can, for example, cause the terminals of diblock structures contained in the block polymer to bond to one another through the coupling agent to thereby convert the diblock structures to a triblock structure (i.e., the diblock content can be reduced).

Examples of coupling agents that can be used in the coupling reaction include, without any specific limitations, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable. Note that through the coupling reaction using a coupling agent, a coupling moiety derived from the coupling agent is introduced into a macromolecule chain (for example, a triblock structure) of the block polymer.

The block polymer solution obtained after the block polymerization and the optional coupling reaction described above can be subjected to the subsequently described emulsification step as obtained, or may be subjected to the emulsification step after performing hydrogenation of the block polymer as necessary as previously described.

—Emulsification Step—

Although no specific limitations are placed on the method of emulsification in the emulsification step, a method involving phase-inversion emulsification of a preliminary mixture of the solution of the block polymer obtained by the previously described block polymer solution production step and an aqueous solution of an emulsifier is preferable, for example. The phase-inversion emulsification can be carried out, for example, using a known emulsifier and a known emulsifying and dispersing device. Specific examples of emulsifying and dispersing devices that can be used include, but are not specifically limited to, batch emulsifying and dispersing devices such as a Homogenizer (product name; produced by IKA), a Polytron (product name; produced by Kinematica AG), and a TK Auto Homo Mixer (product name; produced by Tokushu Kika Kogyo Co., Ltd.); continuous emulsifying and dispersing devices such as a TK Pipeline-Homo Mixer (product name; produced by Tokushu Kika Kogyo Co., Ltd.), a Colloid Mill (product name; produced by Shinko Pantec Co., Ltd.), a Thrasher (product name; produced by Nippon Coke & Engineering Co., Ltd.), a Trigonal Wet Fine Grinding Mill (product name; produced by Mitsui Miike Chemical Engineering Machinery Co., Ltd.), a Cavitron (product name; produced by EUROTEC Ltd.), a Milder (product name; produced by Pacific Machinery & Engineering Co., Ltd.), and a Fine Flow Mill (product name; produced by Pacific Machinery & Engineering Co., Ltd.); high-pressure emulsifying and dispersing devices such as a Microfluidizer (product name; produced by Mizuho Industrial Co., Ltd.), a Nanomizer (product name; produced by Nanomizer Inc.), and an APV Gaulin (product name; produced by Gaulin); membrane emulsifying and dispersing devices such as a Membrane Emulsifier (product name; produced by Reica Co., Ltd.); vibratory emulsifying and dispersing devices such as a Vibro Mixer (product name; produced by Reica Co., Ltd.); and ultrasonic emulsifying and dispersing devices such as an Ultrasonic Homogenizer (product name; produced by Branson). The conditions (processing temperature, processing time, etc.) of the emulsifying operation performed using the emulsifying and dispersing device are not specifically limited and may be selected as appropriate so as to obtain a desired dispersion state.

A water dispersion of the block polymer that has been formed into particles can then be obtained by, for example, using a known method to remove organic solvent from the emulsion obtained after phase-inversion emulsification as necessary.

—Grafting Step—

Although no specific limitations are placed on the method by which graft polymerization is performed in the grafting step, a method in which graft polymerization and cross-linking of the block polymer are caused to proceed concurrently by using a radical initiator such as a redox initiator in the presence of a monomer that is to be graft polymerized is preferable, for example.

The reaction conditions can be adjusted in accordance with the chemical composition of the block polymer, the desired tetrahydrofuran-insoluble content, the desired surface acid content, and so forth.

In the grafting step, it is possible to obtain a water dispersion of a particulate polymer that is formed by a polymer including a block region composed of an aromatic vinyl monomer unit and that has a surface acid content of not less than 0.05 mmol/g and not more than 0.9 mmol/g. Note that in a case in which the grafting step is implemented after the emulsification step (i.e., in a case in which graft polymerization is performed with respect to a block polymer that has been formed into particles), a monomer unit such as an acidic group-containing monomer unit that is introduced through graft polymerization is present to a greater degree toward the surface of the particulate polymer than at the center of the particulate polymer, and thus is concentrated in a surface layer portion of the particulate polymer.

<Water-Soluble Polymer>

The water-soluble polymer is a component that can cause good dispersion of compounded components such as the particulate polymer set forth above in an aqueous medium.

The water-soluble polymer is preferably a water-soluble polymer that includes a hydrophilic group and has a weight-average molecular weight of not less than 15,000 and not more than 500,000. Although no specific limitations are placed on the water-soluble polymer, the water-soluble polymer is preferably a synthetic macromolecule, and is more preferably an addition polymer that is produced by addition polymerization.

Note that the water-soluble polymer may be in the form of a salt (salt of a water-soluble polymer). In other words, the term "water-soluble polymer" as used in the present disclosure is also inclusive of a salt of the water-soluble polymer. Moreover, when a polymer is referred to as "water-soluble" in the present disclosure, this means that when 0.5 g of the polymer is dissolved in 100 g of water at a temperature of 25° C., insoluble content is less than 1.0 mass %.

[Hydrophilic Group]

Examples of hydrophilic groups that can be included in the water-soluble polymer include a carboxyl group, a sulfo group, a phosphate group, and a hydroxyl group. The water-soluble polymer may include just one of these types of hydrophilic groups or may include two or more of these types of hydrophilic groups. Of these hydrophilic groups, a carboxyl group and a sulfo group are preferable, and a carboxyl group is more preferable from a viewpoint of increasing viscosity stability and improving coating density of a slurry composition, inhibiting aggregation of the particulate polymer and the like during application of the slurry composition, and improving handleability of a battery component including a functional layer.

No specific limitations are placed on the method by which a hydrophilic group is introduced into the water-soluble polymer. Although a water-soluble polymer including a hydrophilic group-containing monomer unit may be obtained by producing a polymer through addition polymerization of a monomer that includes any of the hydrophilic groups described above (hydrophilic group-containing monomer) or a water-soluble polymer including any of the hydrophilic groups described above may be obtained through modification (for example, terminal modification) of any polymer, the former of these methods is preferable.

—Hydrophilic Group-Containing Monomer Unit—

The water-soluble polymer preferably includes at least one selected from the group consisting of a carboxyl group-containing monomer unit, a sulfo group-containing monomer unit, a phosphate group-containing monomer unit, and a hydroxyl group-containing monomer unit as a hydrophilic group-containing monomer unit, more preferably includes either or both of a carboxyl group-containing monomer unit and a sulfo group-containing monomer unit as a hydrophilic group-containing monomer unit, and even more preferably includes a carboxyl group-containing monomer unit as a hydrophilic group-containing monomer unit from a viewpoint of increasing stability and improving coating density of a slurry composition, inhibiting aggregation of the particulate polymer and the like during application of the slurry composition, and improving handleability of a battery component including a functional layer. Note that the water-soluble polymer may include just one of the types of hydrophilic group-containing monomer units described above or may include two or more of the types of hydrophilic group-containing monomer units described above.

Examples of carboxyl group-containing monomers that can form a carboxyl group-containing monomer unit, sulfo group-containing monomers that can form a sulfo group-containing monomer unit, and phosphate group-containing monomers that can form a phosphate group-containing monomer unit include the same monomers as can be used for the polymer forming the particulate polymer, for example.

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a—COO—(C_qH_{2q}O)_p—H$ (where p represents an integer of 2 to 9, q represents an integer of 2 to 4, and Ra represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth) allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide.

The proportion constituted by the hydrophilic group-containing monomer unit in the water-soluble polymer when the amount of all repeating units in the water-soluble polymer is taken to be 100 mass % is preferably 10 mass % or more, more preferably 20 mass % or more, even more preferably 30 mass % or more, and particularly preferably 35 mass % or more. When the proportion constituted by the hydrophilic group-containing monomer unit in the water-soluble polymer is 10 mass % or more, it is possible to increase stability and improve coating density of a slurry composition, and also to inhibit aggregation of the particulate polymer and the like during application of the slurry composition and further improve handleability of a battery component including a functional layer. Note that no specific limitations are placed on the upper limit for the proportion constituted by the hydrophilic group-containing monomer unit in the water-soluble polymer, and this proportion can be 100 mass % or less.

—Other Monomer Units—

The water-soluble polymer may include monomer units other than the hydrophilic group-containing monomer unit described above (i.e., other monomer units). No specific limitations are placed on other monomers that can form other monomer units included in the water-soluble polymer so long as they are copolymerizable with a hydrophilic group-containing monomer such as described above. Examples of such other monomers include (meth)acrylic acid ester monomers, fluorine-containing (meth)acrylic acid ester monomers, and cross-linkable monomers.

Monomers given as examples in JP 2015-70245 A, for example, can be used as (meth)acrylic acid ester monomers, fluorine-containing (meth)acrylic acid ester monomers, and cross-linkable monomers.

One other monomer may be used individually, or two or more other monomers may be used in combination.

[Production Method of Water-Soluble Polymer]

The water-soluble polymer can be produced, for example, through polymerization of a monomer composition containing the monomers described above, carried out in an aqueous solvent such as water. In the polymerization, the proportion in which each monomer is contained in the monomer composition can be set in accordance with the proportion in which each monomer unit is included in the water-soluble polymer.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Additives such as emulsifiers, dispersants, polymerization initiators, polymerization aids, and molecular weight modifiers used in the polymerization may be the same as typically used. The amounts of these additives may also be the same as typically used. The polymerization conditions can be adjusted as appropriate depending on the polymerization method, the type of polymerization initiator, and so forth.

[Weight-Average Molecular Weight]

The weight-average molecular weight of the water-soluble polymer is preferably 15,000 or more, more preferably 20,000 or more, and even more preferably 25,000 or more, and is preferably 500,000 or less, preferably 400,000 or less, and more preferably 350,000 or less. When the weight-average molecular weight of the water-soluble polymer is 15,000 or more, stability of a slurry composition can be increased, and coating density of the slurry composition can be improved. Moreover, when the weight-average molecular weight of the water-soluble polymer is 500,000 or less, it is possible to inhibit aggregation of the particulate polymer and the like during application of a slurry composition, and to further increase electrolyte solution injectability and adhesiveness of a functional layer.

The "weight-average molecular weight" of the water-soluble polymer referred to in the present disclosure can be measured by gel permeation chromatography using polyethylene oxide as a standard sample. Moreover, the weight-average molecular weight of the water-soluble polymer can be adjusted by altering the amounts and types of polymerization initiator and molecular weight modifier.

<Aqueous Medium>

The aqueous medium contained in the presently disclosed binder composition is not specifically limited so long as it contains water, and may be an aqueous solution or a mixed solution of water and a small amount of an organic solvent.

<Other Components>

The presently disclosed binder composition can contain components other than those described above (i.e., other components). For example, the binder composition may contain a known particulate binder (styrene butadiene random copolymer, acrylic polymer, etc.) other than the previously described particulate polymer. Moreover, the binder composition may contain known additives. Examples of such known additives include antioxidants such as 2,6-di-tert-butyl-p-cresol, defoamers, and dispersants (excluding those corresponding to the previously described water-soluble polymer). One other component may be used individually, or two or more other components may be used in combination in a freely selected ratio.

<Production Method of Binder Composition>

The presently disclosed binder composition can be produced, without any specific limitations, by mixing the particulate polymer and the optionally used water-soluble polymer and/or other components in the presence of the aqueous medium. Note that in a case in which a dispersion liquid of the particulate polymer and/or an aqueous solution of the water-soluble polymer is used in production of the binder composition, liquid content of the dispersion liquid and/or the aqueous solution may be used as the aqueous medium of the binder composition.

(Slurry Composition for Non-Aqueous Secondary Battery Functional Layer)

The presently disclosed slurry composition is a composition that is for use in formation of a functional layer, that contains the binder composition set forth above, and that optionally further contains functional particles. In other words, the presently disclosed slurry composition contains the previously described particulate polymer and an aqueous medium, and can optionally further contain one or more selected from the group consisting of a water-soluble polymer, functional particles, and other components. As a result of the presently disclosed slurry composition containing the binder composition set forth above, the presently disclosed slurry composition has excellent viscosity stability, and a functional layer formed from the slurry composition has excellent pressability.

<Binder Composition>

The presently disclosed binder composition set forth above, which contains a specific particulate polymer in an aqueous medium, is used as the binder composition.

No specific limitations are placed on the amount of the binder composition in the slurry composition. In a case in which the slurry composition is a slurry composition for an electrode mixed material layer, for example, the amount of the binder composition can be set as an amount such that the amount of the particulate polymer is not less than 0.5 parts by mass and not more than 15 parts by mass, in terms of solid content, per 100 parts by mass of electrode active material particles. Moreover, in a case in which the slurry composition is a slurry composition for a porous membrane layer, for example, the amount of the binder composition can be set as an amount such that the amount of the particulate polymer is not less than 0.2 parts by mass and not more than 30 parts by mass, in terms of solid content, per 100 parts by mass of non-conductive particles.

<Functional Particles>

With regards to functional particles for causing a functional layer to display a desired function, electrode active material particles may be used, for example, in a case in which the functional layer is an electrode mixed material layer, and non-conductive particles may be used, for example, in a case in which the functional layer is a porous membrane layer.

[Electrode Active Material Particles]

Particles formed by known electrode active materials used in secondary batteries can be used without any specific limitations as the electrode active material particles. Specifically, examples of electrode active material particles that can be used in an electrode mixed material layer of a lithium ion secondary battery, which is one example of a secondary battery, include particles formed by any of the electrode active materials described below, but are not specifically limited thereto.

[Positive Electrode Active Material]

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

One of the positive electrode active materials described above may be used individually, or two or more of the positive electrode active materials described above may be used in combination.

[Negative Electrode Active Material]

Examples of negative electrode active materials that can be compounded in a negative electrode mixed material layer of a negative electrode in a lithium ion secondary battery include carbon-based negative electrode active materials, metal-based negative electrode active materials, and negative electrode active materials that are a combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, oxides such as lithium titanate can be used.

One of the negative electrode active materials described above may be used individually, or two or more of the negative electrode active materials described above may be used in combination.

[Non-Conductive Particles]

Examples of non-conductive particles that can be compounded in a porous membrane layer include, without any specific limitations, known non-conductive particles that are used in secondary batteries.

Specifically, although both inorganic fine particles and organic fine particles (excluding those corresponding to a binder such as the previously described particulate polymer) can be used as non-conductive particles, inorganic fine particles are normally used. The material of the non-conductive particles is preferably an electrochemically stable material that is present stably in the environment of use of a secondary battery. Examples of materials of the non-conductive particles that are preferable from the viewpoints set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary. One of the types of non-conductive particles described above may be used individually, or two or more of the types of non-conductive particles described above may be used in combination.

<Other Components>

Examples of other components that can be compounded in the slurry composition include, but are not specifically limited to, the same other components as can be compounded in the presently disclosed binder composition and also, in a case in which the slurry composition is a slurry composition for an electrode mixed material layer, conductive materials that can be compounded in electrode mixed material layers. One other component may be used individually, or two or more other components may be used in combination in a freely selected ratio.

<Production of Slurry Composition>

No specific limitations are placed on the method by which the slurry composition is produced.

In a case in which the slurry composition is a slurry composition for an electrode mixed material layer, for example, the slurry composition can be produced by mixing the binder composition, electrode active material particles, and other components that are used as necessary, in the presence of an aqueous medium.

Moreover, in a case in which the slurry composition is a slurry composition for a porous membrane layer, for example, the slurry composition can be produced by mixing the binder composition, non-conductive particles, and other components that are used as necessary in an aqueous medium.

Furthermore, in a case in which the slurry composition is a slurry composition for an adhesive layer, for example, the binder composition can be used as the slurry composition, the binder composition can be diluted with an aqueous medium and then used as the slurry composition, or the slurry composition can be produced by mixing the binder composition and other components that are used as necessary, in the presence of an aqueous medium.

Note that the aqueous medium used in production of the slurry composition includes the aqueous medium that was contained in the binder composition. The method of mixing is not specifically limited and may involve mixing using a typically used stirrer or disperser.

(Functional Layer for Non-Aqueous Secondary Battery)

The presently disclosed functional layer is a layer having a function such as giving and receiving electrons, reinforcement, or adhesion inside a secondary battery. For example, the functional layer may be an electrode mixed material layer that gives and receives electrons through electrochemical reactions, a porous membrane layer that improves heat resistance and strength of a battery component, or an adhesive layer that improves adhesiveness of a battery component.

Moreover, the presently disclosed functional layer is a layer that is formed from the presently disclosed slurry composition set forth above, and can be formed by, for example, applying the slurry composition set forth above onto the surface of a suitable substrate to form a coating film, and subsequently drying the coating film that is formed. In other words, the presently disclosed functional layer is formed by a dried product of the slurry composition set forth above, normally contains at least a component derived from the previously described particulate polymer, and can optionally further contain one or more selected from the group consisting of a water-soluble polymer, functional particles, and other components. Note that components contained in the functional layer are components that were contained in the slurry composition, and thus the preferred ratio of these components in the functional layer is also the same as the preferred ratio of the components in the slurry composition. Although the particulate polymer is in a particulate form in the slurry composition, the particulate polymer may be in a particulate form or in any other form in the functional layer formed using the slurry composition.

The presently disclosed functional layer can display excellent pressability as a result of being formed from the presently disclosed slurry composition containing the presently disclosed binder composition.

<Substrate>

No limitations are placed on the substrate onto which the slurry composition is applied. For example, a coating film of the slurry composition may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery component of a secondary battery.

However, it is preferable that a current collector, a separator substrate, or an electrode substrate is used as the substrate from a viewpoint of raising battery component production efficiency since a step of peeling the functional layer can be omitted. Specifically, the slurry composition is preferably applied onto a current collector serving as a substrate when an electrode mixed material layer is to be produced. Moreover, the slurry composition is preferably applied onto a separator substrate or an electrode substrate when a porous membrane layer or an adhesive layer is to be produced.

[Current Collector]

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

[Separator Substrate]

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

[Electrode Substrate]

The electrode substrate (positive electrode substrate or negative electrode substrate) is not specifically limited and may be an electrode substrate including an electrode mixed material layer containing electrode active material particles and a binder that is formed on the current collector described above.

Known electrode active material particles and binders can be used without any specific limitations as the electrode active material particles and the binder contained in the electrode mixed material layer of the electrode substrate. Moreover, the presently disclosed functional layer (electrode mixed material layer formed from a slurry composition containing electrode active material particles, a specific particulate polymer, and an aqueous medium) can be used as the electrode mixed material layer of the electrode substrate.

<Formation Method of Functional Layer>

Examples of methods by which the functional layer may be formed on a substrate such as the current collector, the separator substrate, or the electrode substrate described above include:

(1) a method in which the presently disclosed slurry composition is applied onto the surface of the substrate (surface at the electrode mixed material layer side in the case of an electrode substrate; same applies below) and is then dried;

(2) a method in which the substrate is immersed in the presently disclosed slurry composition and is then dried; and (3) a method in which the presently disclosed slurry composition is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the slurry composition onto a substrate (application step) and a step of drying the slurry composition that has been applied onto the substrate to form a functional layer (functional layer formation step).

[Application Step]

Examples of methods by which the slurry composition can be applied onto the substrate in the application step include, but are not specifically limited to, doctor blading, reverse roll coating, direct roll coating, gravure coating, extrusion coating, and brush coating.

[Functional Layer Formation Step]

The method by which the slurry composition on the substrate is dried in the functional layer formation step is not specifically limited and may be a commonly known method. Examples of drying methods that can be used include drying by warm, hot, or low-humidity air, drying in a vacuum, and drying by irradiation with infrared light, electron beams, or the like.

In a case in which the functional layer is an electrode mixed material layer, a pressing process is preferably performed by roll pressing or the like after drying. The pressing process can further increase the density of the obtained electrode mixed material layer.

(Battery Component for Non-Aqueous Secondary Battery)

The presently disclosed battery component is a separator or an electrode, for example, and normally includes the presently disclosed functional layer set forth above on a current collector, separator substrate, or electrode substrate such as previously described. The presently disclosed battery component has excellent pressability as a result of including the presently disclosed functional layer. Consequently, in a case in which the battery component is an electrode, good densification of an electrode mixed material layer that serves as the functional layer can be achieved by pressing. Moreover, in a case in which the battery component is an electrode or separator including a porous membrane layer and/or adhesive layer as the functional layer, good adhesion between battery components can be achieved by performing pressing in a state in which the electrode or separator is stacked with another battery component that is adhered thereto via the porous membrane layer and/or adhesive layer. Furthermore, the presently disclosed battery component enables good production of a secondary battery having excellent battery characteristics.

So long as the presently disclosed battery component is a battery component that is provided with the presently disclosed functional layer, the presently disclosed battery component may include constituent elements other than the presently disclosed functional layer set forth above and a substrate. Examples of such constituent elements include, but are not specifically limited to, electrode mixed material layers, porous membrane layers, and adhesive layers that do not correspond to the presently disclosed functional layer.

Moreover, the battery component may include more than one type of the presently disclosed functional layer. For example, an electrode may include an electrode mixed material layer formed from a presently disclosed slurry composition for an electrode mixed material layer on a current collector and may also include, on the electrode mixed material layer, a porous membrane layer and/or adhesive layer formed from a presently disclosed slurry composition for a porous membrane layer and/or slurry composition for an adhesive layer. In another example, a separator may include a porous membrane layer formed from a presently disclosed slurry composition for a porous membrane layer on a separator substrate and may also include, on the porous membrane layer, an adhesive layer formed from a presently disclosed slurry composition for an adhesive layer.

(Non-Aqueous Secondary Battery)

The presently disclosed secondary battery includes the presently disclosed battery component set forth above. More specifically, the presently disclosed secondary battery includes a positive electrode, a negative electrode, a separator, and an electrolyte solution, and includes the presently disclosed functional layer in at least one battery component among the positive electrode, the negative electrode, and the separator. The presently disclosed secondary battery can display excellent battery characteristics as a result of the presently disclosed battery component being used therein.

<Positive Electrode, Negative Electrode, and Separator>

At least one of the positive electrode, the negative electrode, and the separator used in the presently disclosed secondary battery is the presently disclosed battery component set forth above. Note that known positive electrodes, negative electrodes, and separators can be used without any specific limitations as a positive electrode, negative electrode, or separator other than the presently disclosed battery component (i.e., that does not include the presently disclosed functional layer).

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant laminate as necessary after optionally pressing the laminate, placing the laminate in a battery container, injecting the electrolyte solution into the battery container, and sealing the battery container. At least one battery component among the positive electrode, the negative electrode, and the separator is the presently disclosed battery component including the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the tetrahydrofuran-insoluble content of a polymer forming a particulate polymer, the surface acid content of a particulate polymer, the coatability and viscosity stability of a slurry composition, and the pressability of a battery component were evaluated by the following methods.

<Tetrahydrofuran (THF) Insoluble Content of Polymer>

An obtained water dispersion of a particulate polymer was dried in an environment having a humidity of 50% and a temperature of 23° C. to 25° C. to form a film of approximately 0.3 mm in thickness. The resultant film was cut into 3 mm square and was precisely weighed.

The mass of the film piece obtained by this cutting was taken to be w0. The film piece was immersed in 100 g of tetrahydrofuran (THF) at 25° C. for 24 hours. Thereafter, the film piece was pulled out of the THF, was vacuum dried at 105° C. for 3 hours, and then the mass w1 of insoluble matter was measured.

The THF-insoluble content (mass %) was calculated by the following formula.

$$\text{THF-insoluble content (mass \%)} = (w1/w0) \times 100$$

<Surface Acid Content of Particulate Polymer>

An obtained water dispersion of a particulate polymer was diluted with 0.3% dodecylbenzenesulfonic acid aqueous solution and was adjusted to a solid content concentration of 10%. Thereafter, centrifugal separation was performed for 30 minutes at 7,000 G to collect light liquid. The obtained light liquid was diluted with 0.3% dodecylbenzenesulfonic acid aqueous solution and was adjusted to a solid content concentration of 10%. Thereafter, centrifugal separation was performed for 30 minutes at 7,000 G to collect light liquid. The obtained light liquid was diluted with 0.3% dodecylbenzenesulfonic acid aqueous solution and was adjusted to a solid content concentration of 10%. Thereafter, centrifugal separation of the adjusted sample was performed for 30 minutes at 7,000 G to collect light liquid. The obtained light liquid was adjusted to pH 12.0 with 5% sodium hydroxide aqueous solution. The pH adjusted sample, in an amount of 3.0 g in terms of solid content, was collected in a 100 mL beaker, and then 3 g of an aqueous solution of EMULGEN 120 (produced by Kao Corporation) diluted to 0.2% and 1 g of an aqueous solution of SM5512 (produced by Dow Corning Toray Co., Ltd.) diluted to 1% were added thereto. These materials were uniformly stirred by a stirrer while 0.1N hydrochloric acid aqueous solution was added thereto at a rate of 0.5 mL/30 s and while electrical conductivity was measured at intervals of 30 seconds.

The obtained electrical conductivity data was plotted as a graph with electrical conductivity on a vertical axis (Y coordinate axis) and cumulative amount of added hydrochloric acid on a horizontal axis (X coordinate axis). In this manner, a hydrochloric acid amount-electrical conductivity curve with three inflection points such as illustrated in FIG. 1 was obtained. The X coordinates of the three inflection points were denoted as P1, P2, and P3 in order from the smallest value. Linear approximations L1, L2, and L3 were determined by the least squares method for data in three sections corresponding to X coordinates of: zero to coordinate P1; coordinate P1 to coordinate P2; and coordinate P2 to coordinate P3. An X coordinate of an intersection point of the linear approximation L1 and the linear approximation L2 was taken to be A1, and an X coordinate of an intersection point of the linear approximation L2 and the linear approximation L3 was taken to be A2. The surface acid content per 1 g of the particulate polymer was determined as a hydrochloric acid-equivalent value (mmol/g) from the following formula (a).

$$\text{Surface acid content per 1 g of particulate polymer} = (A2-A1)/3.0 \text{ g} \quad (a)$$

<Coatability of Slurry Composition>
[Coatability of Slurry Composition for Negative Electrode]

An obtained slurry composition for a negative electrode was applied onto copper foil at 50 m/min using a die coater such as to have a coating weight of 12 mg/cm$^2$. The number of defects per 1 m$^2$ was measured by an in-line image analyzer, and coatability was evaluated by the following standard. A smaller number of defects indicates that the slurry composition for a negative electrode has better coatability.

A: Number of defects is fewer than 2 defects/m$^2$
B: Number of defects is not fewer than 2 defects/m$^2$ and fewer than 4 defects/m$^2$
C: Number of defects is 4 defects/m$^2$ or more

[Coatability of Slurry Composition for Porous Membrane Layer]

An obtained slurry composition for a porous membrane layer was applied onto a separator substrate at 50 m/min using a die coater such as to have a coating weight of 3 mg/cm$^2$. The number of defects per 1 m$^2$ was measured by an in-line image analyzer, and coatability was evaluated by the following standard. A smaller number of defects indicates that the slurry composition for a porous membrane layer has better coatability.

A: Number of defects is fewer than 2 defects/m$^2$
B: Number of defects is not fewer than 2 defects/m$^2$ and fewer than 4 defects/m$^2$
C: Number of defects is 4 defects/m$^2$ or more <Viscosity Stability of Slurry Composition>

A solution present before addition of a binder composition during production of a slurry composition was sampled and the viscosity M0 (mPa·s) thereof was measured under conditions of a measurement temperature of 25° C., a No. 4 measurement rotor, and a rotation speed of 60 rpm using a B-type viscometer (produced by Toki Sangyo Co., Ltd.; product name: TV-25).

In addition, a slurry composition obtained after addition of the binder composition was sampled, was loaded into a vessel having a diameter of 5.5 cm and a height of 8.0 cm, and was stirred for 10 minutes at a rotation speed of 3,000 rpm using a TK Homo Disper (produced by PRIMIX Corporation; disper blade diameter: 40 mm). The viscosity M1 (mPa·s) of the slurry composition after stirring was measured in the same way as the viscosity M0 of the solution present before binder composition addition.

The rate of viscosity change ΔM (={(M1−M0)/M0}× 100%) was calculated and was evaluated by the following standard. A smaller rate of viscosity change ΔM indicates that the slurry composition has higher viscosity stability.

A: Rate of viscosity change ΔM is less than 10%
B: Rate of viscosity change ΔM is not less than 10% and less than 30%
C: Rate of viscosity change ΔM is 30% or more <Pressability of Battery Component>
[Pressability of Electrode (Negative Electrode)]

A negative electrode web before rolling by roll pressing was punched with a diameter of 12 mm to obtain a test specimen. The test specimen was set on a flat plate and then the negative electrode mixed material layer (functional layer) was pressed with a pressure of 5 MPa. The mass and the thickness of the test specimen after pressing were measured, and the density of the negative electrode mixed material layer was calculated. This pressing test was performed 10 times. An average value of the calculated densities was taken to be the pressed density (g/cm$^3$) and was used to evaluate pressability by the following standard. A higher pressed density indicates better pressability.

A: Pressed density is 1.70 g/cm$^3$ or more
B: Pressed density is not less than 1.60 g/cm$^3$ and less than 1.70 g/cm$^3$
C: Pressed density is less than 1.60 g/cm$^3$

[Pressability of Separator]

A positive electrode, a negative electrode, and a separator that had been produced were each cut out as 10 mm in width and 50 mm in length. A laminate of the positive electrode and the separator and a laminate of the negative electrode and the separator were each prepared and were then pressed at a temperature of 40° C. using a flat plate press to obtain test specimens.

Each of the obtained test specimens was placed with the surface at the current collector side of the electrode (positive electrode or negative electrode) facing downward, and cellophane tape was affixed to the surface of the current collector. Tape prescribed by JIS Z1522 was used as the cellophane tape. Also note that the cellophane tape was secured to a horizontal test stage in advance.

Subsequently, the stress at the time when the separator was peeled by pulling one end of the separator vertically upward at a pulling speed of 50 mm/min was measured. This measurement was made three times each for laminates of the positive electrode and the separator and laminates of the negative electrode and the separator (i.e., six times in total). The average value of the measured stresses was determined as the peel strength.

Measurement of the peel strength as described above was performed while adjusting the pressing load during laminate pressing by the flat plate press so as to determine the pressing load at which the peel strength became 4 N/m or more. Pressability was then evaluated by the following standard. When the peel strength becomes 4 N/m or more at a lower pressing load, this indicates that adhesive strength can be displayed without damaging the separator substrate through excessive pressing, and thus indicates better pressability.

A: Pressing load at which peel strength becomes 4 N/m or more is less than 4 MPa B: Pressing load at which peel strength becomes 4 N/m or more is not less than 4 MPa and less than 5 MPa C: Pressing load at which peel strength becomes 4 N/m or more is 5 MPa or more Example 1

<Production of Binder Composition for Non-Aqueous Secondary Battery Negative Electrode>[Production of cyclohexane solution of block polymer]

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals. Next, 0.3 parts of 2,6-di-tert-butyl-p-cresol as an antioxidant was added to 100 parts of the reaction liquid (containing 30.0 parts of polymer component) and was mixed therewith. The resultant mixed solution was gradually dripped into hot water of 85° C. to 95° C. so as to volatilize the solvent and obtain a precipitate. This precipitate was pulverized and was then hot-air dried at 85° C. to collect a dried product containing a block polymer.

The dried product that was collected was then dissolved in cyclohexane to produce a block polymer solution in which the concentration of the block polymer was 25%.
[Phase-Inversion Emulsification]

A mixture obtained by mixing sodium alkylbenzenesulfonate, sodium polyoxyethylene alkyl sulfosuccinate, and sodium polyoxyethylene alkyl ether sulfate in a ratio of 1:1:1 (by mass) was dissolved in deionized water to produce a 5% aqueous solution.

A tank was charged with 500 g of the obtained block polymer solution and 500 g of the obtained aqueous solution, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 15,000 rpm to cause phase-inversion emulsification of the preliminary mixture and obtain an emulsion.

Cyclohexane in the obtained emulsion was subsequently vacuum evaporated in a rotary evaporator. Thereafter, the emulsion resulting from this evaporation was left to separate for 1 day in a chromatographic column equipped with a stop-cock, and the lower layer portion after separation was removed to perform concentration.

Finally, the upper layer portion was filtered through a 100-mesh screen to obtain a water dispersion (block polymer latex) containing a particulate block polymer.
[Graft Polymerization and Cross-Linking]

The obtained block polymer latex was diluted by adding 850 parts of distilled water per 100 parts, in terms of solid content, of the block polymer latex. The diluted block polymer latex was loaded into a polymerization reactor that was equipped with a stirrer and had been purged with nitrogen, and was then heated to a temperature of 30° C. under stirring.

A separate vessel was used to produce a dilute solution of methacrylic acid by mixing 10 parts of methacrylic acid as an acidic group-containing monomer and 16 parts of distilled water. The dilute solution of methacrylic acid was added over 30 minutes into the polymerization reactor that had been heated to 30° C.

A separate vessel was also used to produce a solution containing 7 parts of distilled water and 0.01 parts of ferrous sulfate (produced by Chubu Chelest Co., Ltd.; product name: Frost Fe) as a reducing agent. After adding the obtained solution into the polymerization reactor, 0.5 parts of 1,1,3,3-tetramethylbutyl hydroperoxide (produced by NOF Corporation; product name: PEROCTA H) was added as an oxidizing agent, and a reaction was carried out at 30° C. for 1 hour and then at 70° C. for 2 hours. The polymerization conversion rate was 99%.

This yielded a water dispersion (binder composition) of a particulate polymer formed by a polymer obtained through graft polymerization and cross-linking of the block polymer.

The obtained water dispersion of the particulate polymer was used to measure the THF-insoluble content of the polymer forming the particulate polymer and the surface acid content of the particulate polymer. The results are shown in Table 1.
<Production of Slurry Composition for Non-Aqueous Secondary Battery Negative Electrode>

A mixture was obtained by adding 100 parts of artificial graphite (capacity: 360 mAh/g) as a negative electrode active material, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.0 parts in terms of solid content of a binder composition composed of the water dispersion produced as described above were added to the obtained mixed liquid, and the final solid content concentration was adjusted to 48%. Further mixing was performed for 10 minutes, and then a defoaming process was carried out under reduced pressure to yield a slurry composition for a negative electrode having good fluidity.

Slurry composition viscosity stability was evaluated during production of the slurry composition for a negative electrode. Also, the obtained slurry composition for a negative electrode was used to evaluate coatability. The results are shown in Table 1.

<Formation of Negative Electrode>

The obtained slurry composition for a negative electrode was applied onto copper foil (current collector) of 15 μm in thickness by a comma coater such as to have a coating weight after drying of 11 mg/cm$^2$. The applied slurry composition was dried by conveying the copper foil inside a 60° C. oven for 2 minutes at a speed of 0.5 m/min. Thereafter, 2 minutes of heat treatment was performed at 120° C. to obtain a negative electrode web.

The negative electrode web was rolled by roll pressing to obtain a negative electrode having a negative electrode mixed material layer density of 1.75 g/cm$^3$.

Pressability of the negative electrode was evaluated. The result is shown in Table 1.

<Formation of Positive Electrode>

A slurry composition for a positive electrode was obtained by combining 100 parts of LiCoO$_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70%, and mixing these materials using a planetary mixer.

The obtained slurry composition for a positive electrode was applied onto aluminum foil (current collector) of 20 μm in thickness by a comma coater such as to have a coating weight after drying of 23 mg/cm$^2$. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode having a positive electrode mixed material layer density of 4.0 g/cm$^3$.

<Preparation of Separator>

A separator made from a single layer of polypropylene (produced by Celgard, LLC.; product name: Celgard 2500) was prepared as a separator composed of a separator substrate.

<Production of Lithium Ion Secondary Battery>

A rectangle of 49 cm×5 cm was cut out from the obtained positive electrode and was placed with the surface at the positive electrode mixed material layer side thereof facing upward. A separator that had been cut out as 120 cm×5.5 cm was arranged on the positive electrode mixed material layer such that the positive electrode was positioned at a longitudinal direction left-hand side of the separator. In addition, a rectangle of 50 cm×5.2 cm was cut out from the obtained negative electrode and was arranged on the separator such that the surface at the negative electrode mixed material layer side thereof faced toward the separator and such that the negative electrode was positioned at a longitudinal direction right-hand side of the separator. The resultant laminate was wound by a winding machine to obtain a roll.

The roll was enclosed in an aluminum packing case serving as a battery case, electrolyte solution (solvent: ethylene carbonate/diethyl carbonate/vinylene carbonate=68.5/30/1.5 (volume ratio); electrolyte: LiPF$_6$ of 1 M in concentration) was injected such that no air remained, and an opening of the aluminum packing case was closed by heat sealing at 150° C. to produce a wound lithium ion secondary battery having a capacity of 800 mAh. Good operation of the lithium ion secondary battery was confirmed.

Example 2

A binder composition for a negative electrode, a slurry composition for a negative electrode, a negative electrode, a positive electrode, a separator, and a lithium ion secondary battery were produced in the same way as in Example 1 with the exception that a binder composition for a negative electrode produced as described below was used. Evaluations were conducted in the same manner as in Example 1. The results are shown in Table 1.

<Production of Binder Composition for Non-Aqueous Secondary Battery Negative Electrode>

A water dispersion of a particulate polymer formed by a polymer obtained through graft polymerization and cross-linking of a block polymer was produced in the same way as in Example 1.

In addition, a reactor was charged with 150 parts of deionized water, 25 parts of sodium dodecylbenzenesulfonate aqueous solution (concentration: 10%) as an emulsifier, 63 parts of styrene as an aromatic vinyl monomer, 3.5 parts of itaconic acid as a carboxyl group-containing monomer, 1 part of 2-hydroxyethyl acrylate as a hydroxyl group-containing monomer, and 0.5 parts of t-dodecyl mercaptan as a molecular weight modifier in this order. Next, gas inside the reactor was purged three times with nitrogen, and then 32.5 parts of 1,3-butadiene was added into the reactor as an aliphatic conjugated diene monomer. The reactor was maintained at 60° C. while 0.5 parts of potassium persulfate was added as a polymerization initiator to initiate a polymerization reaction that was then continued under stirring. At the point at which the polymerization conversion rate reached 96%, cooling was performed and 0.1 parts of hydroquinone aqueous solution (concentration: 10%) was added as a polymerization inhibitor to terminate the polymerization reaction. Thereafter, residual monomer was removed using a rotary evaporator having a water temperature of 60° C. to obtain a water dispersion of a particulate binder (styrene butadiene random copolymer).

A mixture was obtained by loading the water dispersion of the particulate polymer and the water dispersion of the particulate binder into a vessel such that the mass ratio in terms of solid content was particulate polymer:particulate binder=70:30. The obtained mixture was stirred for 1 hour using a stirrer (produced by SHINTO Scientific Co., Ltd.; product name: Three-One Motor) to obtain a binder composition for a negative electrode.

Example 3

A binder composition for a negative electrode, a slurry composition for a negative electrode, a negative electrode, a positive electrode, a separator, and a lithium ion secondary battery were produced in the same way as in Example 1 with the exception that the amount of methacrylic acid was changed to 15 parts when performing graft polymerization and cross-linking in production of the binder composition for a non-aqueous secondary battery negative electrode.

Evaluations were conducted in the same manner as in Example 1. The results are shown in Table 1.

Example 4

A binder composition for a negative electrode, a slurry composition for a negative electrode, a negative electrode, a positive electrode, a separator, and a lithium ion secondary battery were produced in the same way as in Example 1 with the exception that the amount of methacrylic acid was changed to 30 parts and 0.5 parts of tertiary-methylbutyl hydroperoxide (produced by NOF Corporation; product name: PERBUTYL H) was used instead of 1,1,3,3-tetramethylbutyl hydroperoxide (produced by NOF Corporation; product name: PEROCTA H) as an oxidizing agent when performing graft polymerization and cross-linking in production of the binder composition for a non-aqueous secondary battery negative electrode. Evaluations were conducted in the same manner as in Example 1. The results are shown in Table 1.

Example 5

A binder composition for a negative electrode, a slurry composition for a negative electrode, a negative electrode, a positive electrode, a separator, and a lithium ion secondary battery were produced in the same way as in Example 1 with the exception that a cyclohexane solution of a block polymer was produced and graft polymerization and cross-linking were performed as described below in production of the binder composition for a non-aqueous secondary battery negative electrode. Evaluations were conducted in the same manner as in Example 1. The results are shown in Table 1.
[Production of Cyclohexane Solution of Block Polymer]

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals.

Next, the resultant mixed solution was transferred to a pressure-resistant reactor including a stirring device, and then 2.0 parts of a silica-alumina-supported nickel catalyst (E22U produced by Nikki Chemical Co., Ltd.; amount of supported nickel: 60%) as a hydrogenation catalyst and 100 parts of dehydrated cyclohexane were added and mixed therewith. The inside of the reactor was purged with hydrogen gas, and then the solution was stirred while supplying hydrogen and performing a hydrogenation reaction for 4 hours at a temperature of 170° C. and a pressure of 4.5 MPa. Once the hydrogenation reaction had ended, the reaction solution was filtered to remove the hydrogenation catalyst and was then filtered using a Zeta Plus® (Zeta Plus is a registered trademark in Japan, other countries, or both) filter 30H (produced by CUNO Inc.; pore diameter: 0.5 μm to 1 μm) and a metal fiber filter (produced by Nichidai Corporation; pore diameter: 0.4 μm), in order, so as to remove fine solid content. Thereafter, cyclohexane (solvent) and other volatile components were removed from the solution at a temperature of 260° C. and a pressure of 0.001 MPa or less using a cylindrical evaporator (Kontro produced by Hitachi, Ltd.), and hydrogenated block polymer was extruded in a molten state as strands from a die that was directly connected to the cylindrical evaporator. Cooling and subsequent cutting by a pelletizer were performed to obtain a hydrogenated block polymer.

The hydrogenated block polymer was dissolved in cyclohexane, and then 0.3 parts of 2,6-di-tert-butyl-p-cresol as an antioxidant was added to the resultant solution (containing 30.0 parts of polymer component) and was mixed therewith to produce a block polymer solution in which the concentration of the hydrogenated block polymer was 25%.

A $^1$H-NMR spectrum was measured both before and after the hydrogenation reaction. The percentage hydrogenation of the obtained hydrogenated block polymer as calculated based on the amount of decrease between before and after the hydrogenation reaction of an integrated value for signals corresponding to unsaturated bonds of main chain and side chain portions and unsaturated bonds of aromatic rings was 65%.
[Graft Polymerization and Cross-Linking]

A block polymer latex obtained through phase-inversion emulsification in the same way as in Example 1 was diluted by adding 850 parts of distilled water per 100 parts, in terms of solid content, of the block polymer latex. The diluted block polymer latex was loaded into a polymerization reactor that was equipped with a stirrer and had been purged with nitrogen, and was then heated to a temperature of 30° C. under stirring.

A separate vessel was used to produce a dilute solution of methacrylic acid by mixing 15 parts of methacrylic acid as an acidic group-containing monomer and 16 parts of distilled water. The dilute solution of methacrylic acid was added over 30 minutes into the polymerization reactor that had been heated to 30° C.

A separate vessel was also used to produce a solution containing 7 parts of distilled water and 0.01 parts of ferrous sulfate (produced by Chubu Chelest Co., Ltd.; product name: Frost Fe) as a reducing agent. After adding the obtained solution into the polymerization reactor, 0.6 parts of 1,1,3,3-tetramethylbutyl hydroperoxide (produced by NOF Corporation; product name: PEROCTA H) was added as an oxidizing agent, and then a reaction was carried out at 30° C. for 1 hour. The polymerization conversion rate was 95%.

This yielded a water dispersion (binder composition) of a particulate polymer formed by a polymer obtained through graft polymerization and cross-linking of the block polymer.

Example 6

A binder composition for a negative electrode, a slurry composition for a negative electrode, a negative electrode, a positive electrode, a separator, and a lithium ion secondary battery were produced in the same way as in Example 1 with the exception that the binder composition for a non-aqueous secondary battery negative electrode was produced as described below. Evaluations were conducted in the same manner as in Example 1. The results are shown in Table 1.

<Production of Binder Composition for Non-Aqueous Secondary Battery Negative Electrode>
[Production of Cyclohexane Solution of Block Polymer]

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals. The resultant mixed solution was gradually dripped into hot water of 85° C. to 95° C. so as to volatilize solvent and obtain a precipitate. This precipitate was pulverized and was then hot-air dried at 85° C. to collect a dried product containing a block polymer.

The dried product that was collected was then dissolved in cyclohexane to produce a block polymer solution in which the concentration of the block polymer was 10%.
[Graft Polymerization]

After adding 30 g of methacrylic acid as an acidic group-containing monomer to 10 kg of the obtained block polymer solution, these materials were stirred at 30° C. In addition, 8 g of dimethyl 2,2'-azobis(2-methylpropionate) was added as a polymerization initiator, and the temperature was raised to 80° C. and was held at 80° C. for 2 hours to obtain a reaction liquid containing a polymer obtained through graft polymerization of the block polymer.

Next, 0.1 parts of 2,6-di-tert-butyl-p-cresol as an antioxidant was added to 100 parts of the obtained reaction liquid (containing 10.0 parts of polymer component) and was mixed therewith. The resultant mixed solution was gradually dripped into hot water heated to 85° C. to 95° C. so as to volatilize solvent and obtain a precipitate. This precipitate was pulverized and was then hot-air dried at 85° C. to collect a dried product containing the polymer.

The dried product that was collected was then dissolved in cyclohexane to produce a polymer solution in which the concentration of the polymer was 25%.
[Phase-Inversion Emulsification]

A mixture obtained by mixing sodium alkylbenzenesulfonate, sodium polyoxyethylene alkyl sulfosuccinate, and sodium polyoxyethylene alkyl ether sulfate in a ratio of 1:1:1 (by mass) was dissolved in deionized water to produce a 5% aqueous solution.

A tank was charged with 500 g of the obtained polymer solution and 500 g of the obtained aqueous solution, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 15,000 rpm to cause phase-inversion emulsification of the preliminary mixture and obtain an emulsion.

Cyclohexane in the obtained emulsion was subsequently vacuum evaporated in a rotary evaporator. Thereafter, the emulsion resulting from this evaporation was left to separate for 1 day in a chromatographic column equipped with a stop-cock, and the lower layer portion after separation was removed to perform concentration.

Finally, the upper layer portion was filtered through a 100-mesh screen to obtain a water dispersion (binder composition) containing a particulate polymer.

Example 7

<Production of Binder Composition for Non-Aqueous Secondary Battery Porous Membrane Layer>
[Production of Cyclohexane Solution of Block Polymer]

A block polymer solution was produced in the same way as in Example 1.
[Phase-Inversion Emulsification]

A water dispersion (block polymer latex) containing a particulate block polymer was obtained in the same way as in Example 1.
[Graft Polymerization and Cross-Linking]

A water dispersion (binder composition) of a particulate polymer was obtained in the same way as in Example 1.

The obtained water dispersion of the particulate polymer was used to measure the THF-insoluble content of the polymer forming the particulate polymer and the surface acid content of the particulate polymer. The results are shown in Table 1.
<Production of Slurry Composition for Non-Aqueous Secondary Battery Porous Membrane Layer>

A water dispersion containing 100 parts of alumina (produced by Sumitomo Chemical Co., Ltd.; product name AKP3000) as non-conductive particles and 0.5 parts of carboxymethyl cellulose (produced by Daicel FineChem Ltd.; product no.: 1380) was prepared. Next, 10 parts in terms of solid content of the binder composition for a porous membrane layer obtained as described above was added, and mixing was performed using a ball mill to produce a slurry composition for a non-aqueous secondary battery porous membrane layer.

Slurry composition viscosity stability was evaluated during production of the slurry composition for a porous membrane layer, and the obtained slurry composition for a porous membrane layer was used to evaluate coatability. The results are shown in Table 1.
<Formation of Porous Membrane Layer-Equipped Separator>

The slurry composition for a porous membrane layer obtained as described above was applied onto one side of a separator made from a single layer of polypropylene (produced by Celgard, LLC.; product name: Celgard 2500) serving as a separator substrate and was dried at 50° C. for 3 minutes. Thereafter, the slurry composition for a porous membrane layer obtained as described above was applied onto the other side of the separator and was dried at 50° C. for 3 minutes to obtain a porous membrane layer-equipped separator including porous membrane layers at both sides (each 2 μm in thickness).

The porous membrane layer-equipped separator was used to evaluate separator pressability. The result is shown in Table 1.
<Formation of Positive Electrode>

A positive electrode including a positive electrode mixed material layer was obtained in the same way as in Example 1.

<Formation of Negative Electrode>

A negative electrode including a negative electrode mixed material layer was obtained in the same way as in Example 1 with the exception that a binder composition for a negative electrode produced as described below was used.

[Production of Binder Composition for Non-Aqueous Secondary Battery Negative Electrode]

A reactor was charged with 150 parts of deionized water, 25 parts of sodium dodecylbenzenesulfonate aqueous solution (concentration: 10%) as an emulsifier, 63 parts of styrene as an aromatic vinyl monomer, 3.5 parts of itaconic acid as a carboxyl group-containing monomer, 1 part of 2-hydroxyethyl acrylate as a hydroxyl group-containing monomer, and 0.5 parts of t-dodecyl mercaptan as a molecular weight modifier in this order. Next, gas inside the reactor was purged three times with nitrogen, and then 32.5 parts of 1,3-butadiene was added into the reactor as an aliphatic conjugated diene monomer. The reactor was maintained at 60° C. while 0.5 parts of potassium persulfate was added as a polymerization initiator to initiate a polymerization reaction that was then continued under stirring. At the point at which the polymerization conversion rate reached 96%, cooling was performed and 0.1 parts of hydroquinone aqueous solution (concentration: 10%) was added as a polymerization inhibitor to terminate the polymerization reaction. Thereafter, residual monomer was removed using a rotary evaporator having a water temperature of 60° C. to obtain a water dispersion of a styrene butadiene random copolymer as a particulate binder for a negative electrode. The water dispersion was used as a binder composition for a negative electrode.

<Production of Lithium Ion Secondary Battery>

A rectangle of 49 cm×5 cm was cut out from the obtained positive electrode and was placed with the surface at the positive electrode mixed material layer side thereof facing upward. A porous membrane layer-equipped separator that had been cut out as 120 cm×5.5 cm was arranged on the positive electrode mixed material layer such that the positive electrode was positioned at a longitudinal direction left-hand side of the porous membrane layer-equipped separator. In addition, a rectangle of 50 cm×5.2 cm was cut out from the obtained negative electrode and was arranged on the porous membrane layer-equipped separator such that the surface at the negative electrode mixed material layer side thereof faced toward a porous membrane layer and such that the negative electrode was positioned at a longitudinal direction right-hand side of the porous membrane layer-equipped separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to produce a wound lithium ion secondary battery having a capacity of 800 mAh. Good operation of the lithium ion secondary battery was confirmed.

Example 8

A binder composition for a porous membrane layer, a slurry composition for a porous membrane layer, a porous membrane layer-equipped separator, a negative electrode, a positive electrode, and a lithium ion secondary battery were produced in the same way as in Example 7 with the exception that graft polymerization and cross-linking were performed in the same way as in Example 4 in production of the binder composition for a non-aqueous secondary battery porous membrane layer. Evaluations were conducted in the same manner as in Example 7. The results are shown in Table 1.

Example 9

A binder composition for a porous membrane layer, a slurry composition for a porous membrane layer, a porous membrane layer-equipped separator, a negative electrode, a positive electrode, and a lithium ion secondary battery were produced in the same way as in Example 7 with the exception that production of a cyclohexane solution of a block polymer and also graft polymerization and cross-linking were performed in the same way as in Example 5 in production of the binder composition for a non-aqueous secondary battery porous membrane layer. Evaluations were conducted in the same manner as in Example 7. The results are shown in Table 1.

Comparative Example 1

A binder composition for a negative electrode, a slurry composition for a negative electrode, a negative electrode, a positive electrode, a separator, and a lithium ion secondary battery were produced in the same way as in Example 1 with the exception that the binder composition for a non-aqueous secondary battery negative electrode was produced as described below. Evaluations were conducted in the same manner as in Example 1. The results are shown in Table 1.

<Production of Binder Composition for Non-Aqueous Secondary Battery Negative Electrode>

A reactor was charged with 150 parts of deionized water, 25 parts of sodium dodecylbenzenesulfonate aqueous solution (concentration: 10%) as an emulsifier, 25 parts of styrene as an aromatic vinyl monomer, 5 parts of methacrylic acid as an acidic group-containing monomer, and 0.5 parts of t-dodecyl mercaptan as a molecular weight modifier in this order. Next, gas inside the reactor was purged three times with nitrogen, and then 75 parts of 1,3-butadiene was added into the reactor as an aliphatic conjugated diene monomer. The reactor was maintained at 60° C. while 0.5 parts of potassium persulfate was added as a polymerization initiator to initiate a polymerization reaction that was then continued under stirring. At the point at which the polymerization conversion rate reached 96%, cooling was performed and 0.1 parts of hydroquinone aqueous solution (concentration: 10%) was added as a polymerization inhibitor to terminate the polymerization reaction.

Thereafter, residual monomer was removed using a rotary evaporator having a water temperature of 60° C. to obtain a water dispersion (binder composition) of a particulate random polymer (particulate polymer).

Comparative Example 2

A binder composition for a negative electrode, a slurry composition for a negative electrode, a negative electrode, a positive electrode, a separator, and a lithium ion secondary battery were produced in the same way as in Example 1 with the exception that graft polymerization and cross-linking were performed as described below in production of the binder composition for a non-aqueous secondary battery negative electrode. Evaluations were conducted in the same manner as in Example 1. The results are shown in Table 1.

[Graft Polymerization and Cross-Linking]

The obtained block polymer latex was diluted by adding 750 parts of distilled water per 100 parts, in terms of solid content, of the block polymer latex. The diluted block polymer latex was loaded into a polymerization reactor that was equipped with a stirrer and had been purged with nitrogen, and was then heated to a temperature of 30° C. under stirring.

A separate vessel was used to produce a dilute solution of methacrylic acid by mixing 22 parts of methacrylic acid as an acidic group-containing monomer and 16 parts of distilled water. The dilute solution of methacrylic acid was added over 30 minutes into the polymerization reactor that had been heated to 30° C.

A separate vessel was also used to produce a solution containing 7 parts of distilled water and 0.01 parts of ferrous sulfate (produced by Chubu Chelest Co., Ltd.; product name: Frost Fe) as a reducing agent. After adding the obtained solution into the polymerization reactor, 0.8 parts of tertiary-methylbutyl hydroperoxide (produced by NOF Corporation; product name: PERBUTYL H) was added as an oxidizing agent, and then a reaction was carried out at 30° C. for 1 hour. The polymerization conversion rate was 99%.

Comparative Example 3

A binder composition for a negative electrode, a slurry composition for a negative electrode, a negative electrode, a positive electrode, a separator, and a lithium ion secondary battery were produced in the same way as in Example 1 with the exception that graft polymerization and cross-linking were performed as described below in production of the binder composition for a non-aqueous secondary battery negative electrode. Evaluations were conducted in the same manner as in Example 1. The results are shown in Table 1.

[Graft Polymerization and Cross-Linking]

The obtained block polymer latex was diluted by adding 850 parts of distilled water per 100 parts, in terms of solid content, of the block polymer latex. The diluted block polymer latex was loaded into a polymerization reactor that was equipped with a stirrer and had been purged with nitrogen, and was then heated to a temperature of 30° C. under stirring.

A separate vessel was used to produce a dilute solution of methacrylic acid by mixing 2 parts of methacrylic acid as an acidic group-containing monomer and 16 parts of distilled water. The dilute solution of methacrylic acid was added over 30 minutes into the polymerization reactor that had been heated to 30° C.

A separate vessel was also used to produce a solution containing 7 parts of distilled water and 0.01 parts of ferrous sulfate (produced by Chubu Chelest Co., Ltd.; product name: Frost Fe) as a reducing agent. After adding the obtained solution into the polymerization reactor, 0.6 parts of 1,1,3,3-tetramethylbutyl hydroperoxide (produced by NOF Corporation; product name: PEROCTA H) was added as an oxidizing agent, and then a reaction was carried out at 30° C. for 1 hour. The polymerization conversion rate was 99%.

Comparative Example 4

A binder composition for a porous membrane layer, a slurry composition for a porous membrane layer, a porous membrane layer-equipped separator, a negative electrode, a positive electrode, and a lithium ion secondary battery were produced in the same way as in Example 7 with the exception that production of the binder composition for a non-aqueous secondary battery porous membrane layer was carried out in the same way as production of the binder composition for a negative electrode in Comparative Example 1. Evaluations were conducted in the same manner as in Example 7. The results are shown in Table 1.

Comparative Example 5

A binder composition for a porous membrane layer, a slurry composition for a porous membrane layer, a porous membrane layer-equipped separator, a negative electrode, a positive electrode, and a lithium ion secondary battery were produced in the same way as in Example 7 with the exception that graft polymerization and cross-linking were performed in the same way as in Comparative Example 2 in production of the binder composition for a non-aqueous secondary battery porous membrane layer. Evaluations were conducted in the same manner as in Example 7. The results are shown in Table 1.

TABLE 1

| | | | | | Example 1 | Example 2 | Example 3 | Example 4 | Example 5 | Example 6 | Example 7 | Example 8 |
|---|---|---|---|---|---|---|---|---|---|---|---|---|
| Slurry composition | Functional particles | Negative electrode active material (artificial graphite) [parts by mass] | | | 100 | 100 | 100 | 100 | 100 | 100 | — | — |
| | | Non-conductive particles (alumina) [parts by mass] | | | — | — | — | — | — | — | 100 | 100 |
| | Binder composition | Particulate polymer | Structure | Styrene unit [parts by mass] | Block 25 | Block 25 | Block 25 | Block 25 | Block 25 | Block 25 | Block 25 | Block 25 |
| | | | Chemical composition | Butadiene unit [parts by mass] | — | — | — | — | — | — | — | — |
| | | | | Isoprene unit [parts by mass] | — | — | — | — | — | 75 | — | — |
| | | | | Isoprene unit + Cross-linked isoprene unit [parts by mass] | 75 | 75 | 75 | 75 | — | — | 75 | 75 |
| | | | | Isoprene unit + Cross-linked isoprene unit + Hydrogenated isoprene unit [parts by mass] | — | — | — | — | 75 | — | — | — |

TABLE 1-continued

| | | | | | | | | | | | |
|---|---|---|---|---|---|---|---|---|---|---|---|
| | | | Methacrylic acid unit [parts by mass] | 10 | 10 | 15 | 30 | 15 | 3 | 10 | 30 |
| | | | Coupling moiety | Yes | Yes | Yes | Yes | Yes | Yes | Yes | Yes |
| | | | Surface acid content [mmol/g] | 0.20 | 0.20 | 0.40 | 0.85 | 0.20 | 0.30 | 0.20 | 0.85 |
| | | | THF-insoluble content [mass %] | 35 | 35 | 38 | 42 | 11 | 0 | 35 | 42 |
| | | | Amount [parts by mass] | 2 | 1.4 | 2 | 2 | 2 | 2 | 10 | 10 |
| | | Particulate binder | Amount [parts by mass] | — | 0.6 | — | — | — | — | — | — |
| Evaluation | Coatability | | | A | A | A | B | A | A | A | B |
| | Viscosity stability | | | A | A | A | A | A | A | A | A |
| | Pressability | Electrode | | A | A | A | B | A | A | — | — |
| | | Separator | | — | — | — | — | — | — | A | B |

| | | | | | Example 9 | Comparative Example 1 | Comparative Example 2 | Comparative Example 3 | Comparative Example 4 | Comparative Example 5 |
|---|---|---|---|---|---|---|---|---|---|---|
| Slurry composition | Functional particles | Negative electrode active material (artificial graphite) [parts by mass] | | | — | 100 | 100 | 100 | — | — |
| | | Non-conductive particles (alumina) [parts by mass] | | | 100 | — | — | — | 100 | 100 |
| | Binder composition | Particulate polymer | Structure | | Block | Random | Block | Block | Random | Block |
| | | | Chemical composition | Styrene unit [parts by mass] | 25 | 25 | 25 | 25 | 25 | 25 |
| | | | | Butadiene unit [parts by mass] | — | 75 | — | — | 75 | — |
| | | | | Isoprene unit [parts by mass] | — | — | — | — | — | — |
| | | | | Isoprene unit + Cross-linked isoprene unit [parts by mass] | — | — | 75 | 75 | — | 75 |
| | | | | Isoprene unit + Cross-linked isoprene unit + Hydrogenated isoprene unit [parts by mass] | 75 | — | — | — | — | — |
| | | | | Methacrylic acid unit [parts by mass] | 15 | 5 | 22 | 2 | 5 | 22 |
| | | | | Coupling moiety | Yes | — | Yes | Yes | — | Yes |
| | | | Surface acid content [mmol/g] | | 0.20 | 0.20 | 1.00 | 0.02 | 0.20 | 1.00 |
| | | | THF-insoluble content [mass %] | | 11 | 90 | 50 | 30 | 90 | 50 |
| | | | Amount [parts by mass] | | 10 | 2 | 2 | 2 | 10 | 10 |
| | | Particulate binder | Amount [parts by mass] | | — | — | — | — | — | — |
| Evaluation | Coatability | | | | A | C | C | C | C | C |
| | Viscosity stability | | | | A | C | A | C | C | A |
| | Pressability | Electrode | | | — | B | C | A | — | — |
| | | Separator | | | A | — | — | — | B | C |

It can be seen from Table 1 that a slurry composition for a negative electrode having excellent viscosity stability and a negative electrode mixed material layer having excellent pressability were obtained in Examples 1 to 6. On the other hand, it can be seen from Table 1 that viscosity stability of a slurry composition for a negative electrode decreased in Comparative Example 1 in which a random polymer was used, pressability of a negative electrode mixed material layer decreased in Comparative Example 2 in which a particulate polymer having a high surface acid content was used, and viscosity stability of a slurry composition for a negative electrode decreased in Comparative Example 3 in which a particulate polymer having a low surface acid content was used.

It can also be seen from Table 1 that a slurry composition for a porous membrane layer having excellent viscosity stability and a porous membrane layer having excellent pressability were obtained in Examples 7 to 9. On the other hand, it can be seen from Table 1 that viscosity stability of a slurry composition for a porous membrane layer decreased in Comparative Example 4 in which a random polymer was used, and pressability of a porous membrane layer decreased in Comparative Example 5 in which a particulate polymer having a high surface acid content was used.

INDUSTRIAL APPLICABILITY

Through the presently disclosed binder composition for a non-aqueous secondary battery, it is possible to obtain a slurry composition for a non-aqueous secondary battery functional layer having excellent viscosity stability and a functional layer for a non-aqueous secondary battery having excellent pressability.

Moreover, the presently disclosed slurry composition for a non-aqueous secondary battery functional layer has excellent viscosity stability and can form a functional layer for a non-aqueous secondary battery having excellent pressability.

Furthermore, according to the present disclosure, it is possible to obtain a functional layer for a non-aqueous secondary battery that has excellent pressability, a battery component for a non-aqueous secondary battery that includes this functional layer for a non-aqueous secondary battery, and a non-aqueous secondary battery that includes this battery component for a non-aqueous secondary battery.

The invention claimed is:

1. A binder composition for a non-aqueous secondary battery comprising: a particulate polymer formed by a polymer including a block region composed of an aromatic vinyl monomer unit; and water, wherein
the particulate polymer has a surface acid content of not less than 0.05 mmol/g and not more than 0.9 mmol/g.

2. The binder composition for a non-aqueous secondary battery according to claim 1, wherein the polymer further includes a coupling moiety.

3. The binder composition for a non-aqueous secondary battery according to claim 1, wherein the polymer further includes either or both of an aliphatic conjugated diene monomer unit and an alkylene structural unit.

4. The binder composition for a non-aqueous secondary battery according to claim 1, wherein the polymer has a tetrahydrofuran-insoluble content of not less than 5 mass % and not more than 50 mass %.

5. The binder composition for a non-aqueous secondary battery according to claim 4, wherein the polymer is obtained through cross-linking of a block polymer including an aliphatic conjugated diene monomer unit and a block region composed of an aromatic vinyl monomer unit.

6. A slurry composition for a non-aqueous secondary battery functional layer comprising the binder composition for a non-aqueous secondary battery according to claim 1.

7. The slurry composition for a non-aqueous secondary battery functional layer according to claim 6, further comprising electrode active material particles.

8. The slurry composition for a non-aqueous secondary battery functional layer according to claim 6, further comprising non-conductive particles.

9. A functional layer for a non-aqueous secondary battery formed using the slurry composition for a non-aqueous secondary battery functional layer according to claim 6.

10. A battery component for a non-aqueous secondary battery comprising the functional layer for a non-aqueous secondary battery according to claim 9.

11. A non-aqueous secondary battery comprising the battery component for a non-aqueous secondary battery according to claim 10.

* * * * *